United States Patent [19]
Harmon

[11] Patent Number: 5,925,128
[45] Date of Patent: Jul. 20, 1999

[54] ACCESS CONTROL MODULE FOR A PERSONAL COMPUTER

[75] Inventor: Thomas J. Harmon, Bel Air, Md.

[73] Assignee: Leonard Bloom, a part interest, Towson, Md.

[21] Appl. No.: 08/893,742

[22] Filed: Jul. 11, 1997

Related U.S. Application Data

[63] Continuation of application No. 08/620,991, Mar. 22, 1996, abandoned.

[51] Int. Cl.$^6$ ................................................ G06F 11/00
[52] U.S. Cl. ............................................. 713/200; 713/320
[58] Field of Search ............................. 345/186, 188.01, 345/187.01, 780.01, 281, 282, 780.02; 395/186, 188.01, 187.01, 750.01, 281, 282; 361/740, 747

[56] References Cited

U.S. PATENT DOCUMENTS

| | | | |
|---|---|---|---|
| 4,804,943 | 2/1989 | Soleimani | 340/539 |
| 4,898,009 | 2/1990 | Lakoski et al. | 70/58 |
| 5,001,460 | 3/1991 | Basson | 340/571 |
| 5,034,723 | 7/1991 | Maman | 340/568 |
| 5,043,702 | 8/1991 | Kuo | 340/539 |
| 5,142,269 | 8/1992 | Mueller | 340/568 |
| 5,184,798 | 2/1993 | Wilson | 248/551 |
| 5,190,466 | 3/1993 | McVey | 439/304 |
| 5,231,375 | 7/1993 | Sanders et al. | 340/568 |
| 5,239,205 | 8/1993 | Hoffman et al. | 307/117 |
| 5,249,298 | 9/1993 | Bolan et al. | 395/750 |
| 5,254,973 | 10/1993 | Gilmore, II | 340/547 |
| 5,265,238 | 11/1993 | Canova, Jr. et al. | 395/500 |
| 5,340,954 | 8/1994 | Hoffman et al. | 200/277.2 |
| 5,388,156 | 2/1995 | Blackledge, Jr. et al. | 380/4 |
| 5,388,211 | 2/1995 | Hornbuckle | 395/200 |
| 5,390,514 | 2/1995 | Harmon | 70/14 |
| 5,391,928 | 2/1995 | Tomiyori et al. | 307/89 |
| 5,394,713 | 3/1995 | Harmon | 70/58 |
| 5,400,622 | 3/1995 | Harmon | 70/14 |
| 5,406,261 | 4/1995 | Glenn | 340/571 |
| 5,437,235 | 8/1995 | Randolph | 108/15 |
| 5,447,045 | 9/1995 | Cheng | 70/58 |
| 5,463,742 | 10/1995 | Kobayashi | 395/281 |
| 5,502,989 | 4/1996 | Murray, Jr. et al. | 70/58 |
| 5,552,776 | 9/1996 | Wade et al. | 340/825.31 |
| 5,574,786 | 11/1996 | Dayan et al. | 380/4 |
| 5,579,657 | 12/1996 | Makous | 70/15 |

OTHER PUBLICATIONS

USA TODAY; Mar. 1–3, 1996; "Virus strain new 'hazard' to computers".

*Primary Examiner*—Joseph E. Palys
*Attorney, Agent, or Firm*—Leonard Bloom

[57] ABSTRACT

A retrofitted personal computer ("PC") has an access control module attached to the rear wall of the PC. A secondary switch within the access control module is connected in series between the main switch of the PC and the power supply. An authorized user remotely controls the powering of the PC by turning "ON"–"OFF" of the secondary switch through the "ON"–"OFF" radio pre-coded transmitter. The disk drive of the PC is protected by a disk drive lock, which is interconnected with the access control module and the PC by a cable.

6 Claims, 14 Drawing Sheets

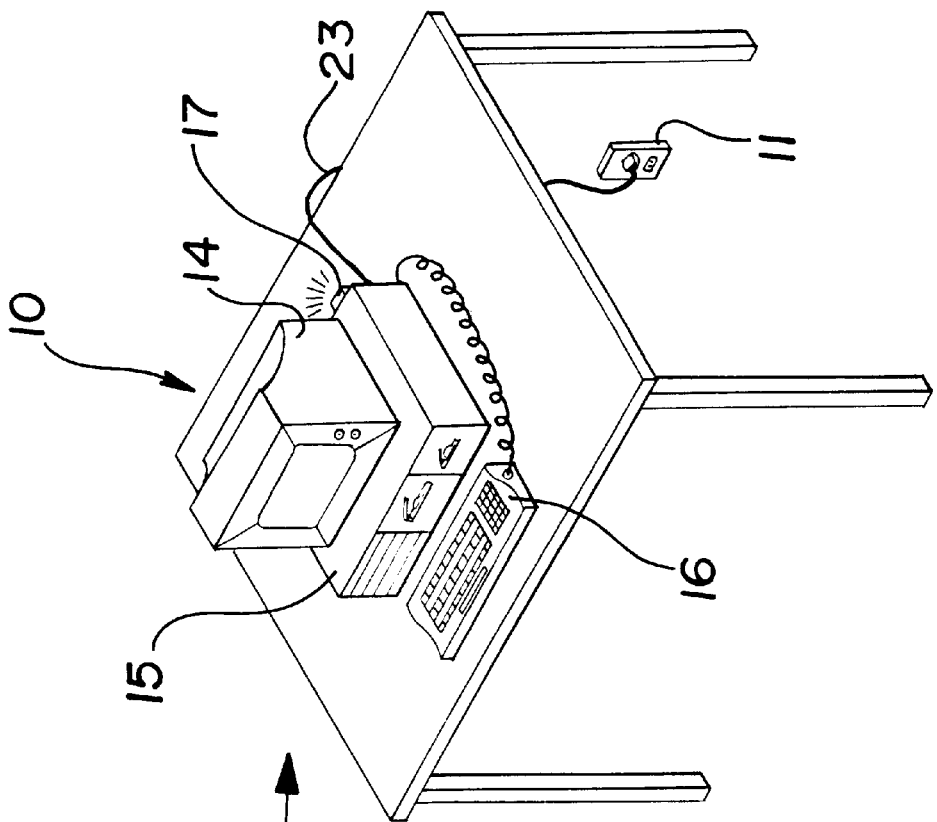
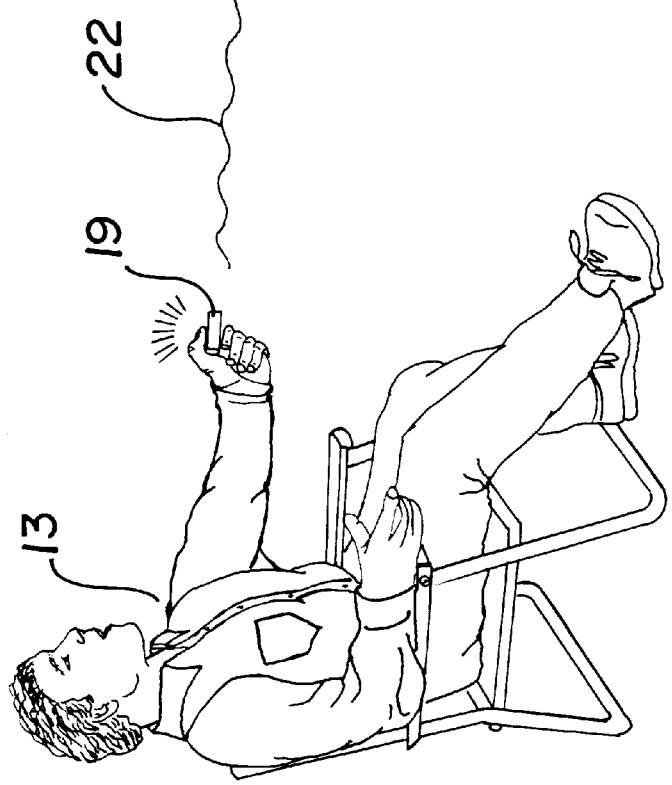
FIG. 2

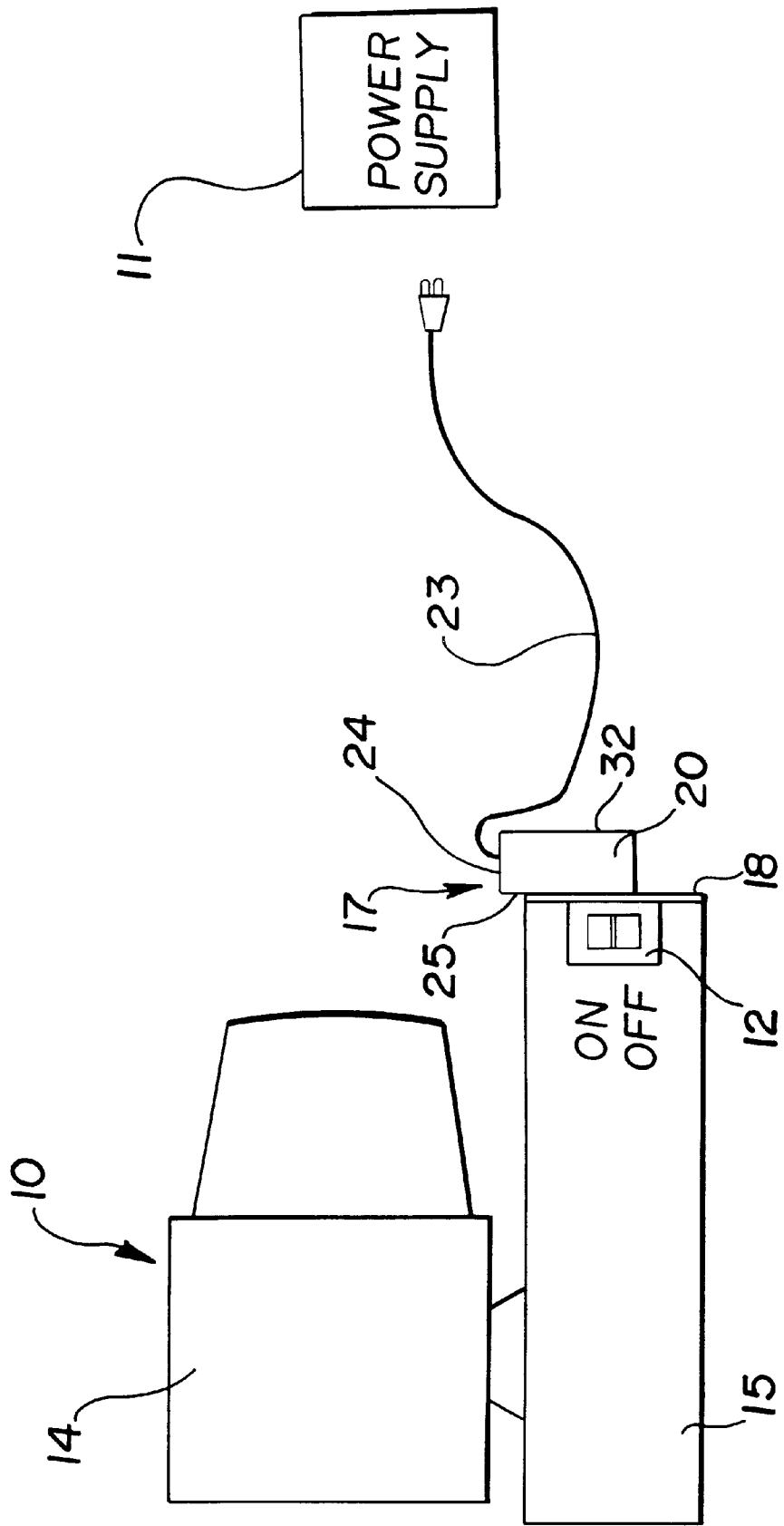

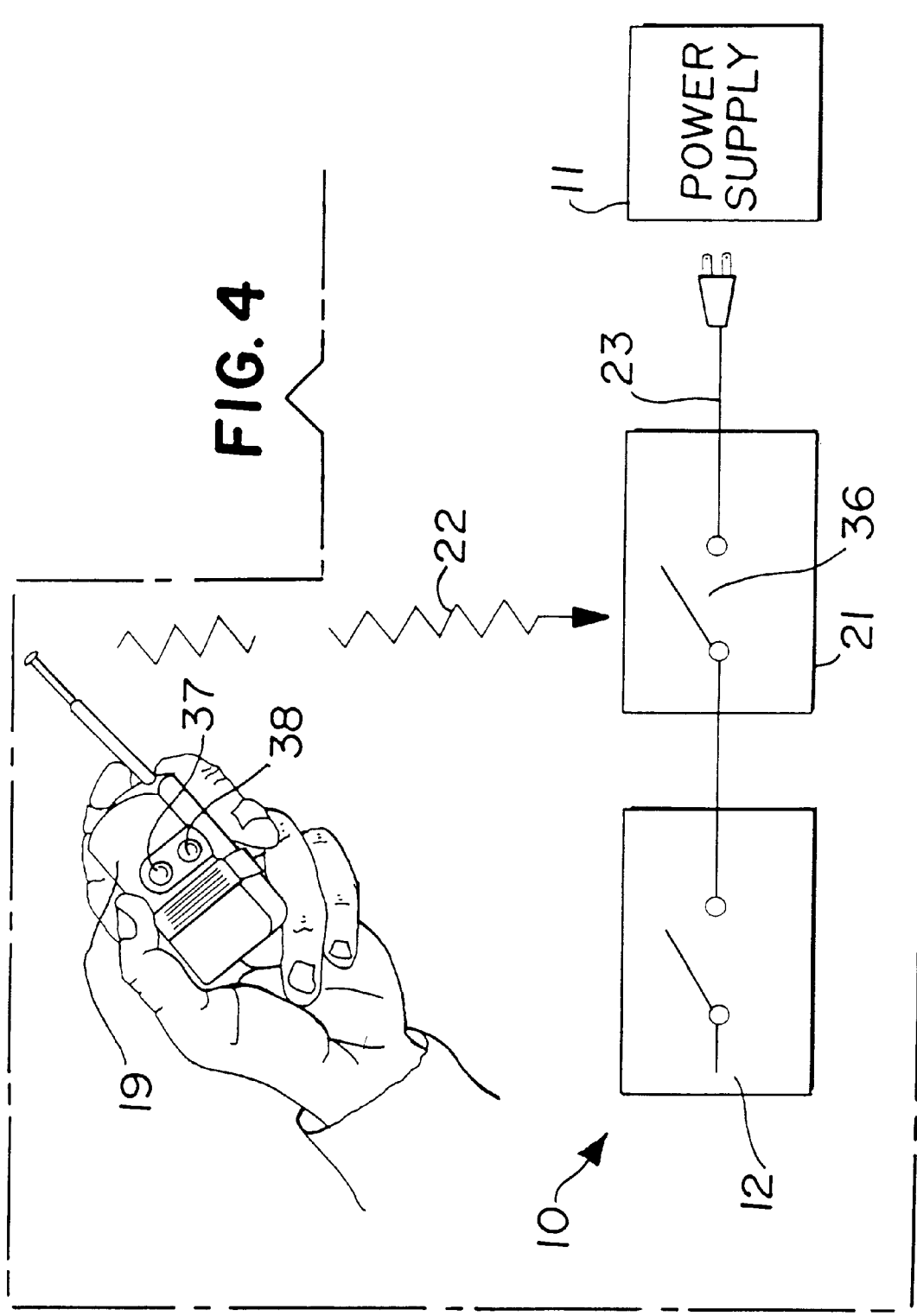

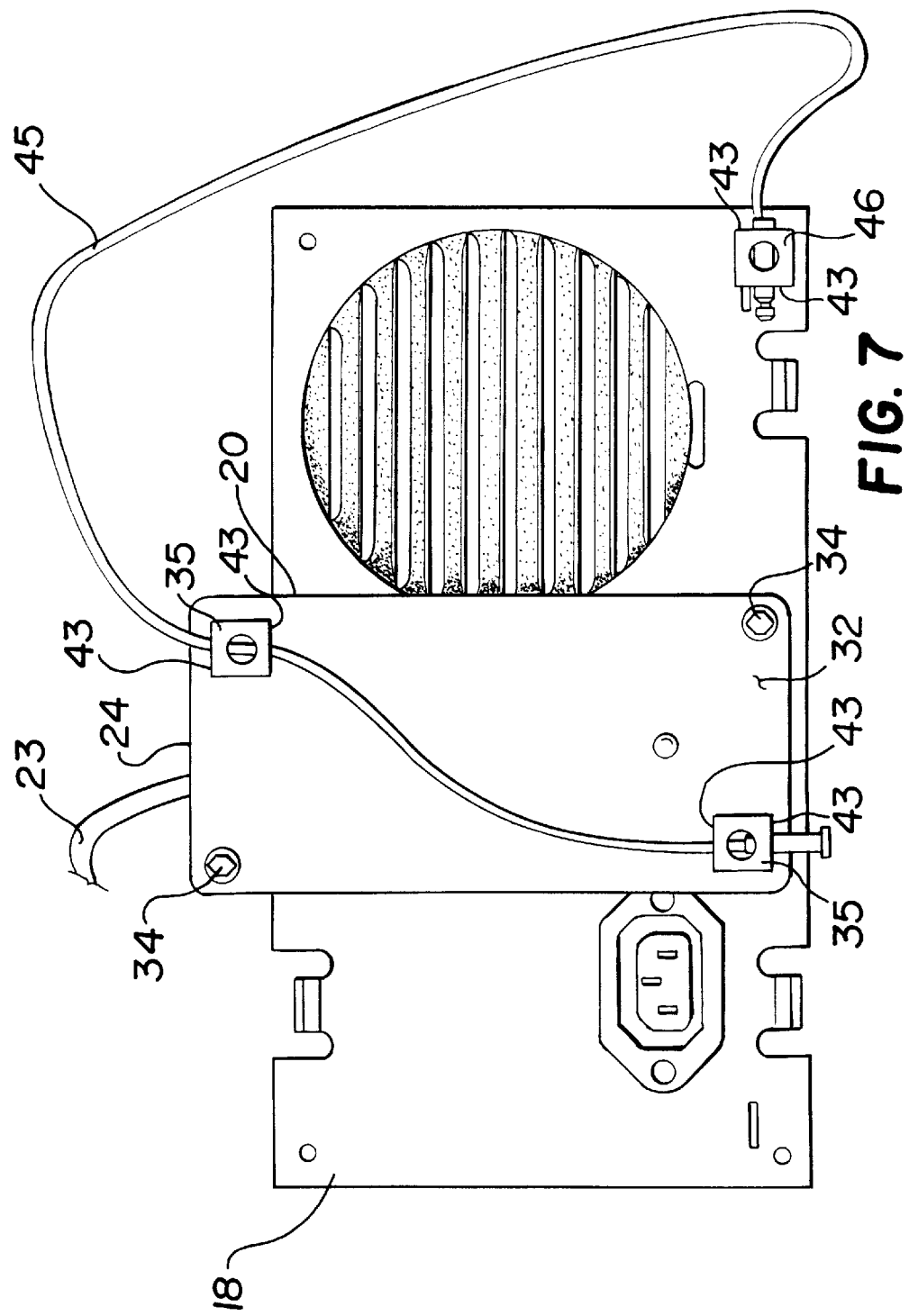

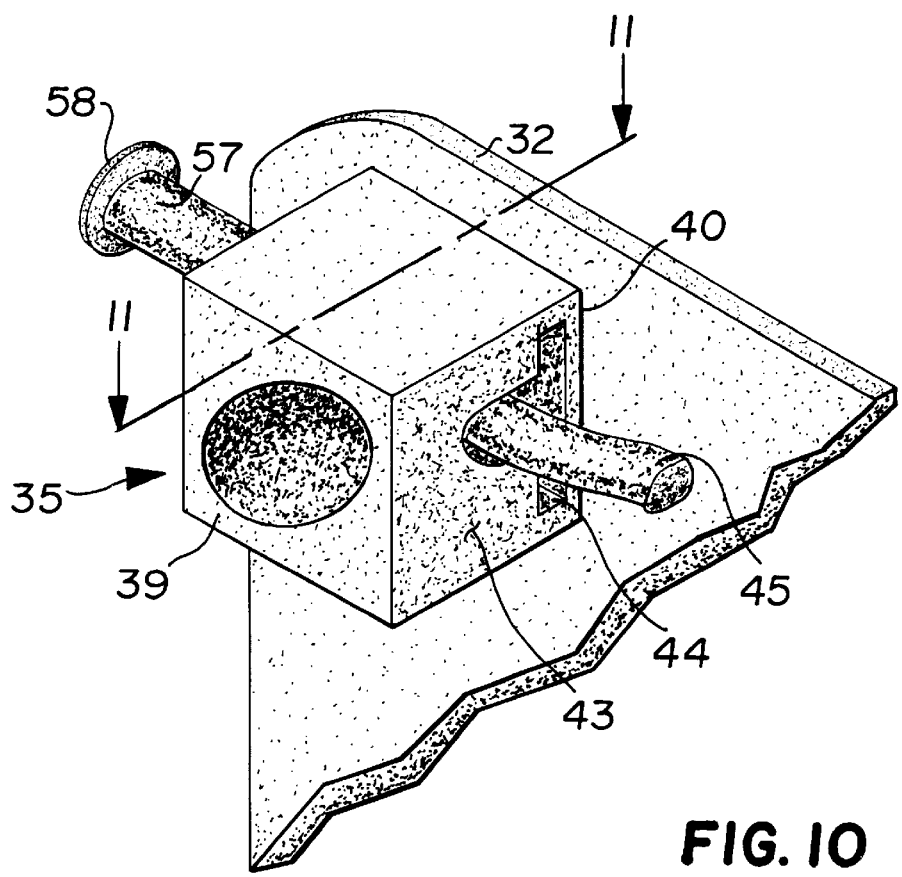
FIG. 10
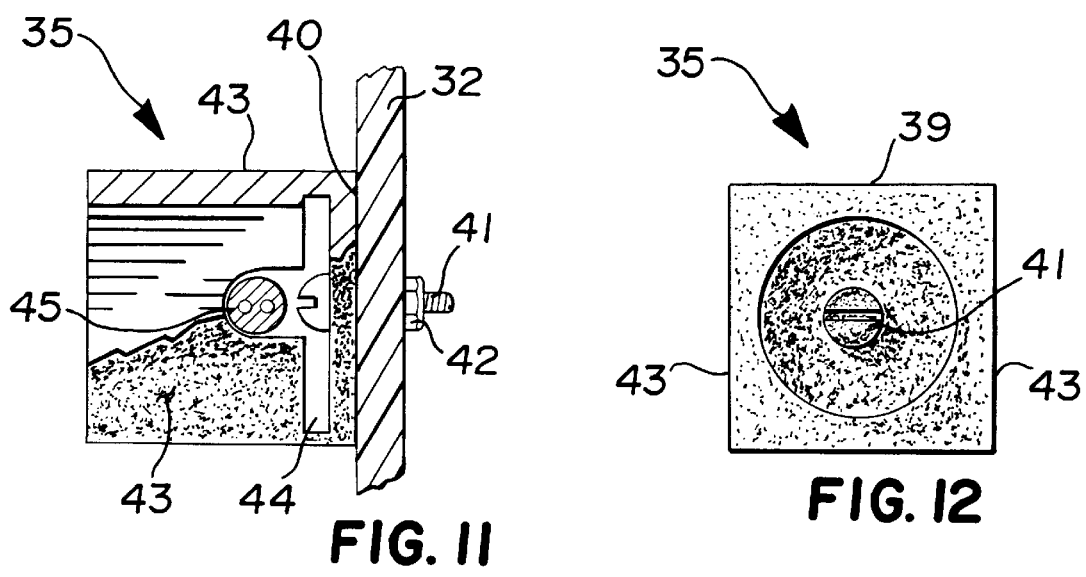
FIG. 11
FIG. 12

ACCESS CONTROL MODULE FOR A PERSONAL COMPUTER

This application is a continuation, of application Ser. No. 08/620,991, filed Mar. 22, 1996, now abandoned.

FIELD OF THE INVENTION

The present invention relates to devices for preventing unauthorized access to a computer system.

BACKGROUND OF THE INVENTION

Personal computers and other computer systems (generally called "PC's") are widely used by businesses and consumers for storing and processing personal or proprietary data which are essential to owners of PC's.

Access to this data by unauthorized persons must be precluded; and it is essential that the data not be copied onto floppy disks without prior authorization, thereby preserving security of the proprietary data. Neither is unauthorized downloading of outside information, such as unnecessary data and computer games, on the PC welcomed since this consumes valuable space on the hard disk and may lead to a virus on the PC.

The "infection" of computer systems with viruses is a serious problem and is a major concern to the National Computer Security Association, and other virus-tracking and virus-fighting groups and organizations. As one prominent virus-tracking group warns: "A strain of computer viruses could wipe out data on personal computers worldwide," published in an article in "USA Today" on Mar. 1, 1996. For example, one of the most common strains (called "Concept") has become the world's No. 1 virus. Macro viruses, like Concept, infect documents rather than programs; therefore, they spread very fast. The cost of eradicating harmful viruses is very high.

Additionally, unauthorized users who pretend to be very computer literate may "play around" with a PC and inadvertently or accidentally wipe out data or interfere with the existing software programs installed in the PC, thereby rendering the PC non-usable and basically worthless to its owner.

Accordingly, numerous attempts have been made in the prior art for preventing theft and unauthorized access to computers.

Prevention of the theft of computers has been implemented by anchoring a computer to a desk with locking means or cable means embracing a part of the desk, as for instance, a leg thereof. Theft of the computers themselves, however, is not as great as a loss of data retained therein. Besides, the locking means can be unlocked, and the cable means can be cut.

A more effective way to protect the data stored in computers from unauthorized access is to employ different protecting programs.

For example, U.S. Pat. No. 5,388,156 describes a personal computer system having security features enabling control over access to data retained in such a system. A specialized memory element is provided for receiving and storing a Privileged Access Password and for coordinating the access granted to various functions and data to the activation and usage of the Privileged Access Password. An authorized user may have choices to activate or inactivate the security provisions.

U.S. Pat. No. 5,388,211 describes a method and apparatus for remotely controlling the use of a computer in a system for renting computer software. A user at a target computer "downloads" programs or data, via a telephone line and remote control units, from a host computer. Usage of the programs or data by the target computer or other accounting data are recorded and stored and, at predetermined times, the host computer "uploads" the usage data for processing.

The above methods of safeguarding computer records need, however, an entire access decoding and storage encoding time; that may be undesired when a user wants to work with data.

Another effective way to protect a computer from unauthorized access thereto is to make its disk drive inaccessible.

Reliable, convenient and inexpensive locking devices for floppy disk drives are disclosed in the applicant's U.S. Pat. Nos. 5,390,514; 5,394,713; and 5,400,622.

For instance, in U.S. Pat. No. 5,400,622, the disk drive lock employs a pair of slats or plates which are pivoted at a hinge for jackknife folding. The disk drive lock may be inserted into virtually any conventional computer disk drive. Once inserted, the slats may be pivoted open, and a padlock is inserted through aligned locking holes to lock the device in its open position, thereby preventing removal from the disk drive and thwarting unauthorized access.

In U.S. Pat. No. 5,394,713, the locking device includes a pair of pivoted plates retained in their expanded position within the disk drive by means of an externally-accessible padlock or its equivalent. In one embodiment, the locking device has respective pairs of pins which sandwich the front cover of the disk drive. In another embodiment, the locking device has respective teeth which frictionally engage the respective spaced-apart side rails of the disk drive. In yet another embodiment, the locking device has both pins and teeth and is provided with a torsion spring constantly biasing the plates into their expanded position.

In U.S. Pat. No. 5,390,514, the locking device includes a pair of pivoted plates retained in their expanded locking position within the disk drive by means of an externally-accessible padlock or its equivalent. Each of the plates carries a spring finger which "bites" into the adjacent respective side rail in the event that an attempt is made to remove the locking device. The locking device is inserted into the disk drive in a one-handed operation and in its locked position. In another embodiment, a key-operated lock is carried on one of the pivoted plates.

A further improvement to the above three locking devices is disclosed in pending application Ser. No. 08/601,235, filed Feb. 14, 1996, wherein a pair of pivoted plates is retained in their expanded locking position by a key-operated lock carried by the plates. Each of the plates carries an arresting mechanism which expands within the disk drive in the event that an attempt is made to remove the locking device and "bites" into the adjacent guide rail, thereby stopping any further movement of the locking device out of the disk drive.

The above locking devices for a computer disk drive are tamper-evident, practical, inexpensive to manufacture and easy to use. However, an overall system for access control and theft protection is desirable.

U.S. Pat. No. 5,406,261 describes another approach to prevention of unauthorized access to a computer system. Power distribution to components within the computer system is remotely controlled through a wireless coded signal transmitter carried by an authorized user of the computer system. The apparatus includes a receiver-decoder and may be connected between the power supply and the components of the computer system such as the floppy disk drive, hard disk drive, system board, keyboard, etc. The receiver-decoder receives a control signal from the transmitter (many options are available regarding what component the user desires to control) and converts the control signal into control codes. These codes are received by the power control unit, which switches power from the power supply according to each of the respective control codes, to selectively energize or inhibit components of the computer system. A timer automatically enables or disables the computer system, and an alarm can be also powered according to control codes. The user can select a desired function by pressing several buttons on the transmitter.

Disadvantageously, the computer security apparatus of this '261 patent is somewhat complicated and expensive.

What is still needed, therefore, is an effective and economical apparatus and method for preventing or inhibiting computer theft while preventing unauthorized access to the PC, one that is readily adaptable for retrofitting existing PC's.

BRIEF SUMMARY OF THE INVENTION

It is, therefore, an object of the present invention to prevent unauthorized access by providing an access control module for a PC, one that is easily attached thereto, and remotely controlled only by an authorized user.

It is another object of the present invention to provide a remotely-controlled second switch inserted between the manually-operated main switch of the PC and the power supply thereof, such that once the second switch has been remotely de-actuated by the authorized user, actuation of the main switch cannot provide power to the PC.

It is yet another object of the present invention to provide a locking means for preventing or discouraging unauthorized access to the disk drive of a PC in combination with a remotely-controlled means on the PC and a hand-held portable device for remotely turning the PC "on" and "off", and further in combination with a cable means interconnecting the disk-drive locking means and the remotely-controlled means on the PC.

It is a further object of the present invention to provide a method for preventing unauthorized access to a PC by remotely controlling turning the PC "ON" or "OFF", the remote control means being accessible only to an authorized person.

The present invention finds particular utility in combination with a PC having a manually-operated main switch for powering the PC from a standard power supply.

According to the teachings of the present invention, an access control module includes a remotely controlled second switch connected in series between the main switch and the power supply, and the PC can be energized only when both the main switch and the second switch are actuated. Once the second switch has been remotely de-actuated by the authorized user, the PC cannot be energized, such that an unauthorized switching of the PC is prevented.

The second switch is controlled through a remote controller, which is a two-button binary coded transmitter transmitting a pre-coded radio signal. The second switch is responsive only to this pre-coded radio signal, which identifies the authorized user.

A housing accommodating a receiver in connection with the second switch is mechanically secured to the wall of the PC.

Preferably, a male socket is located on the wall of the PC, and the housing has a first side with a female connector. The female connector on the first side of the housing is plugged into the male socket on the wall of the PC, and a standard computer power cord is plugged into one of the sides of the housing to connect the PC to the power supply through the access control module.

A fastening means, preferably including at least one screw, secures the first side of the housing to the rear wall of the PC.

In a preferred embodiment, a cable is provided in which the first end thereof is secured to the side of the housing opposite to the first side thereof, and the second end of the cable is secured to the PC. Preferably, a disk drive lock prevents unauthorized access to the disk drive. The second end of the cable then is secured to the disk drive lock.

The wall of the PC has additional fastening means preventing unauthorized removal of the wall from the PC, and a portion of the cable is secured to the wall of the PC by the additional fastening means.

The cable is secured to the housing of the access control module and to the wall of the PC by retainers, which are secured to the housing and to the PC by screws unaccessible from outside once the cable is protruded through the retainers. Preferably, the receiver and the switch are carried by a printed circuit board within the housing.

Viewed in another aspect, the present invention comprises, in combination with a PC intended to be used only by an authorized user and having at least one switch therein for energizing the PC from a power source, a portable device intended to be carried by the authorized user of the PC. The portable device preferably has a first manually-operable means and cooperates with a second means in the PC for remotely closing the at least one switch in the PC, thereby preventing unauthorized use of the PC and guaranteeing use of the PC only by the authorized user.

Viewing in still another aspect, the present invention is a method for preventing unauthorized access to a PC by connecting a remotely-controlled second switch in series between the main switch in the PC and the power supply and switching the second switch ON or OFF through a hand-held coded transmitter; this transmitter transmits, one at a time, a first signal (actuating the second switch) and a second signal (deactivating the second switch). The transmitter is operated by the authorized user. Once the second switch is "OFF", the PC in no way can be energized by an unauthorized person.

Preferably, a disk drive lock is provided to prevent unauthorized access to the disk drive; and a cable interconnects a housing accommodating the second switch and attached to the PC, a wall of the PC, and the disk drive lock, respectively.

These and other objects of the present invention will become apparent from a reading of the following specification taken in conjunction with the enclosed drawings.

BRIEF DESCRIPTION OF THE DRAWINGS

FIG. 2 shows, partially, the improvement of the present invention wherein a PC equipped with the access control module is remotely operated by an authorized user.

FIG. 3 corresponds substantially to FIG. 1 but shows the access control module of the present invention secured to the rear wall of the PC.

FIG. 4 shows, somewhat schematically, a block-diagram of the operation of the access control module of the present invention.

FIG. 7 shows the access control module secured to the wall of the PC (with the front wall of the housing of the access control module adjacent to the wall of the PC).

FIG. 10 shows how the cable is secured by the retainer to the housing of the access control module.

FIG. 11 is a side view of the retainer of FIG. 10, partially cross-sectioned along lines 11—11.

FIG. 12 is a top view of the retainer of FIGS. 10 and 11.

GENERAL DESCRIPTION OF THE PREFERRED EMBODIMENTS

Figure 1:
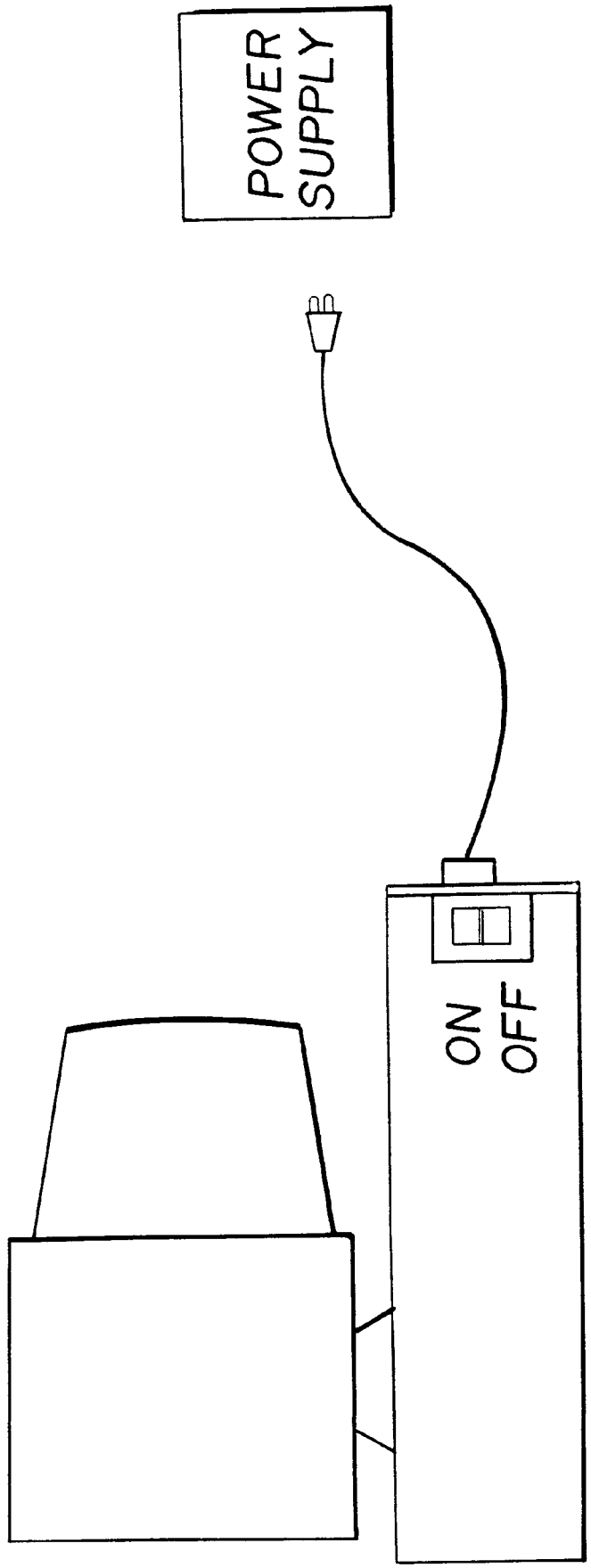
FIG. 1 shows somewhat schematically, a personal computer or "PC" widely used in the prior art.
Figure 6:
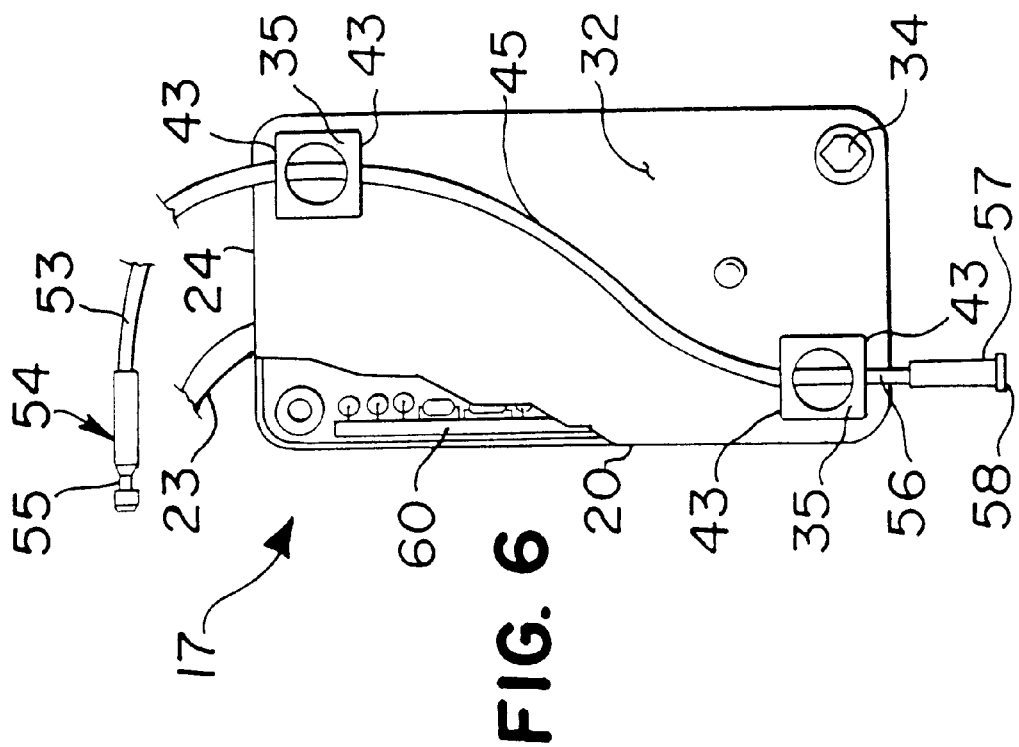
FIG. 6 is a rear view of the housing of the access control module, partially broken to show a printed circuit board therein.
Figure 5:
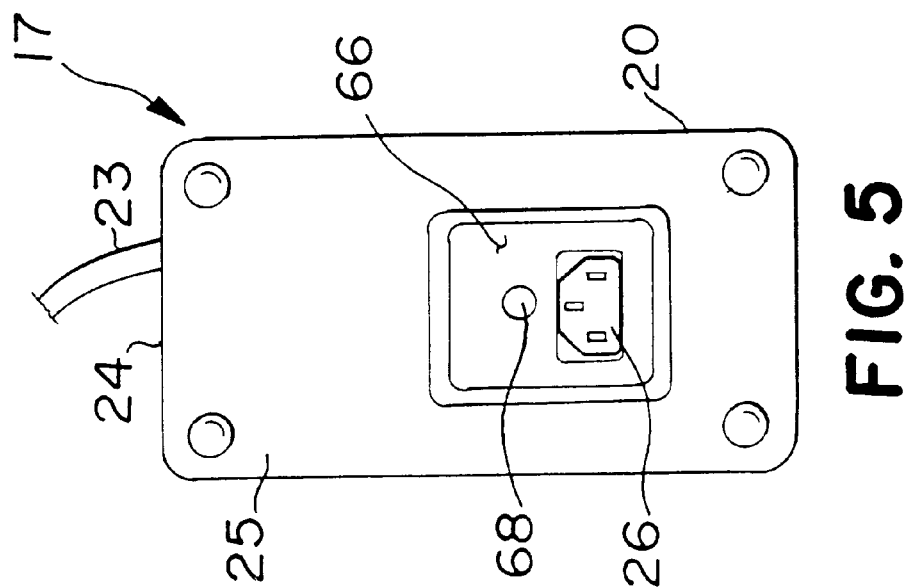
FIG. 5 is a front view of the housing of the access control module.

FIG. 1 shows a personal computer ("PC") 10, which is powered by a power supply and improved by the present invention (as described below).

Referring to FIGS. 2–4, the PC 10 has a main (or primary) switch 12 which is manually operated by a monitor 14, a processing unit 15 and a keyboard 16. Optionally, other peripheral devices like a mouse, printer, etc. (not shown) can be connected to the PC 10.

As best shown in FIGS. 2, 3, 13 and 15, the control access module 17 of the present invention is installed on the rear wall 18 of the processing unit 15 of the PC 10 to be remotely controlled by the authorized user 13 through a transmitter 19.

As best shown in FIGS. 5–8, 17 and 18, the access control module 17 has a housing 20 which has a receiver 21 for receiving a signal 22 from the transmitter 19. The housing 20 is mechanically secured to the rear wall 18 by fastening means described below. For this purpose, a standard power cord 23 is removed from a plug on the PC 10 and is plugged into a female plug on a side 24 of the housing 20. Another side 25 of the housing 20 is provided with a female connector 26 which is plugged into a standard male socket 27 (best shown on FIG. 8) on the rear wall 18 of the PC 10.

Figure 8:
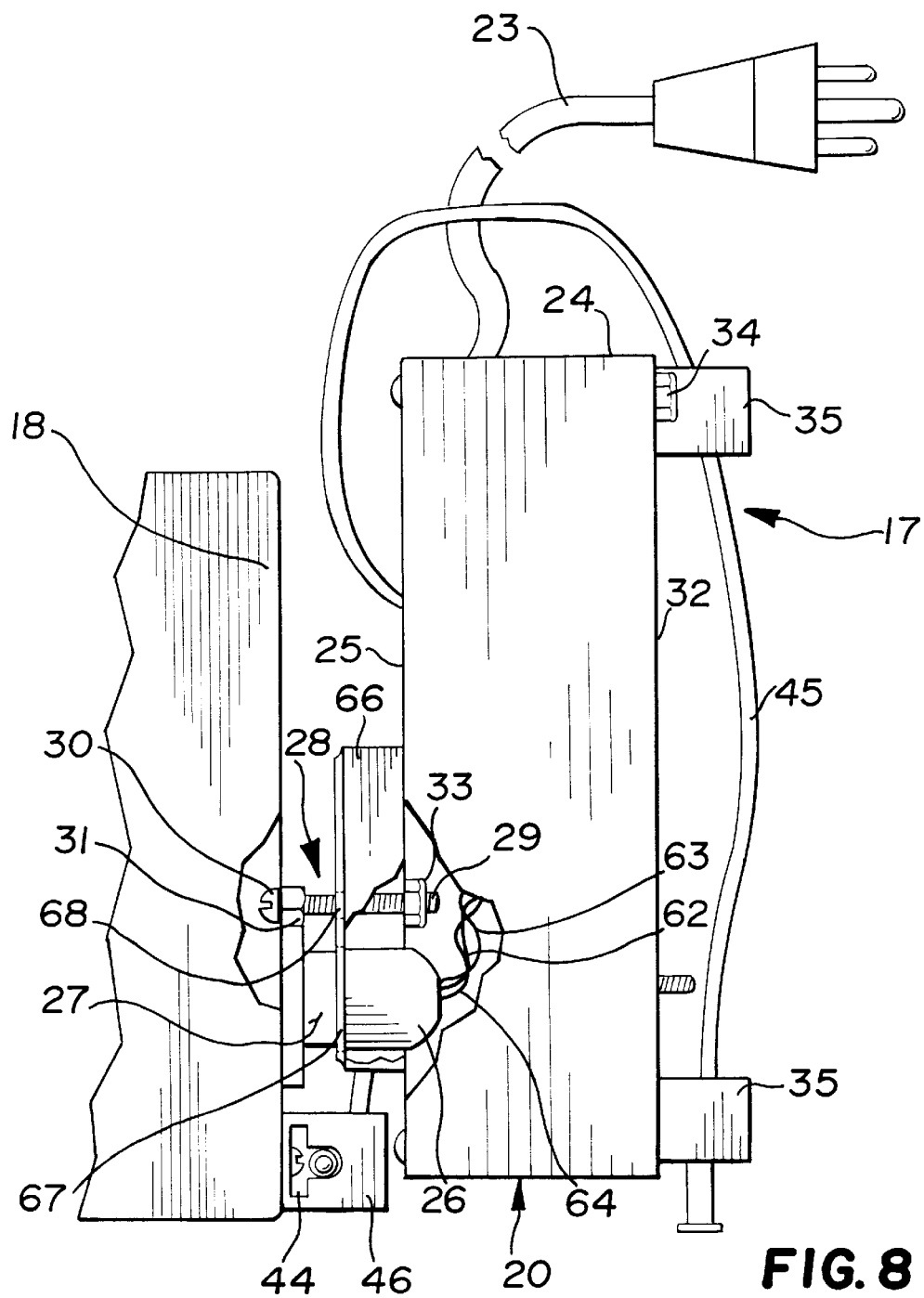
FIG. 8 is a side view of the partially sectioned access control module secured to the wall of the PC.

As best shown in FIG. 8, a fastening means 28 secures housing 20 to the rear wall 18. The fastening means 28 has a threaded bolt 29 secured to the rear wall 18 of the PC 10 by a bolt head 30 and a nut 31.

During the installation of the housing 20 to the rear wall 18, a cover 32 of the housing 20 is opened, such that, after coupling the female connector 26 of the housing 20 to the male socket 27 at the rear wall 18, a nut 33 is threaded onto the threaded bolt 29 and tightened to maintain a desired connection between the female connector 26 and the male socket 24, and to secure the housing 20 to the rear wall 18.

After that, the cover 32 is placed onto the housing 20 and is secured thereto by screws 34. As best shown in FIGS. 7 and 8, the fastening means 28 is not accessible from outside of the PC and therefore cannot be removed, thereby preventing the housing 20 from being removed from the rear wall 18 of the PC 10.

In order to prevent the cover 32 from being removed from the housing 20, a pair of retainers 35 (discussed below) are secured to the housing 20.

The housing 20 accommodates the receiver 21 (best shown in FIGS. 4, 9 and 17) which receives the signal 22 from the transmitter 19. The receiver 21 controls a second switch 36 which is connected in series between the main switch 12 and the power supply 11 (as soon as the access control module 17 is installed on the PC 10 as discussed above). Therefore, the PC 10 can be powered when—and only when—both the main switch 12 and the second (or the secondary) switch 36 are actuated (or closed). If at least one switch (12 or 36) is de-actuated (or opened), the PC 10 is not powered and cannot be used.

Accordingly, once the secondary switch 36 has been de-actuated by the authorized user 13 through the transmitter 19, nobody can energize the PC 10, even if the main switch 12 is turned "ON". Thus, an unauthorized person cannot have access to the data stored in the PC 10.

When the authorized user 13 wants to use the PC 10, he (or she) transmits a signal 22 which will close (turn "ON") the secondary switch 36. Thereafter, the PC 10 can be powered if the main switch 12 will be turned "ON".

The transmitter 19 is a two button binary radio transmitter. One button is an "ON" button 37, another button is an "OFF" button 38. When the "ON" button 37 is actuated, the pre-coded radio signal for closing the second switch 36 is transmitted to the access control module 17. The receiver 21 receives the closing signal and closes the second switch 36. When the "OFF" button 38 is actuated, a pre-coded radio signal for opening the second switch 36 is transmitted to the access control module 17. The receiver 21 receives the opening signal and opens the second switch 36. Both the closing and the opening signals are pre-coded to identify the authorized user, such that the second switch is responsive only to these pre-coded radio signals.

The mechanism of operation of the access control module 17 is very simple since it includes only an "ON"–"OFF" operation. But despite the simplicity, the present invention can provide an effective prevention of unauthorized access to the information, data and documents stored in the PC 10.

In one of the implementations of the present invention, only one remotely controlled switch can be operated to power the PC 10 or to inhibit the power supply thereto. For example, by isolating the main switch 12 (or maintaining it permanently in the "ON" position) only switch 36 can be remotely operated to control the access to the PC 10. Also, the manually operated key or button main switch 12 can be substituted by a remotely operated main switch.

As discussed above, the access control module 17 is secured to the rear wall 18 by the fastening means 28 which is protected from being accessed by the cover 32 secured to the housing 20. As best shown in FIGS. 5–8, 10–13 and 15, the retainers 35 provide additional protection and preclude the cover 32 from being removed from the housing 20. Each retainer 35 includes a body 39 having a bottom 40 placed against the cover 32. The bottom 40 has a central hole (not shown) to let a screw 41 therethrough and through a respective hole 59 in the cover 32 (internally of the housing 20). A nut 42 secures the screw 41 and the bottom 40 of the body 39 to the cover 32. The body 39 also has side walls 43 with openings 44 shaped in such a way that to let a cable 45 to be protruded through the openings 44 to prevent access to the screw 41 (as best shown in FIG. 11), thereby providing an additional protection to the housing 20 from being removed from the rear wall 18, since the cover 32 cannot be removed and the fastening screw 28 cannot be accessed.

A retainer 46 (shown in FIG. 8) is similar to the retainers 35 and is mounted on the rear wall 18 of the PC 10 for securing the cable 45 to the rear wall 18 and for additional protection for the rear wall 18 from being removed out of the PC 10. When the cable 45 is protruded through the body 39 of the retainer 46, the screw securing the retainer 46 to the rear wall 18 cannot be accessed and the rear wall 18 cannot be removed from the PC 10.

Figure 14:
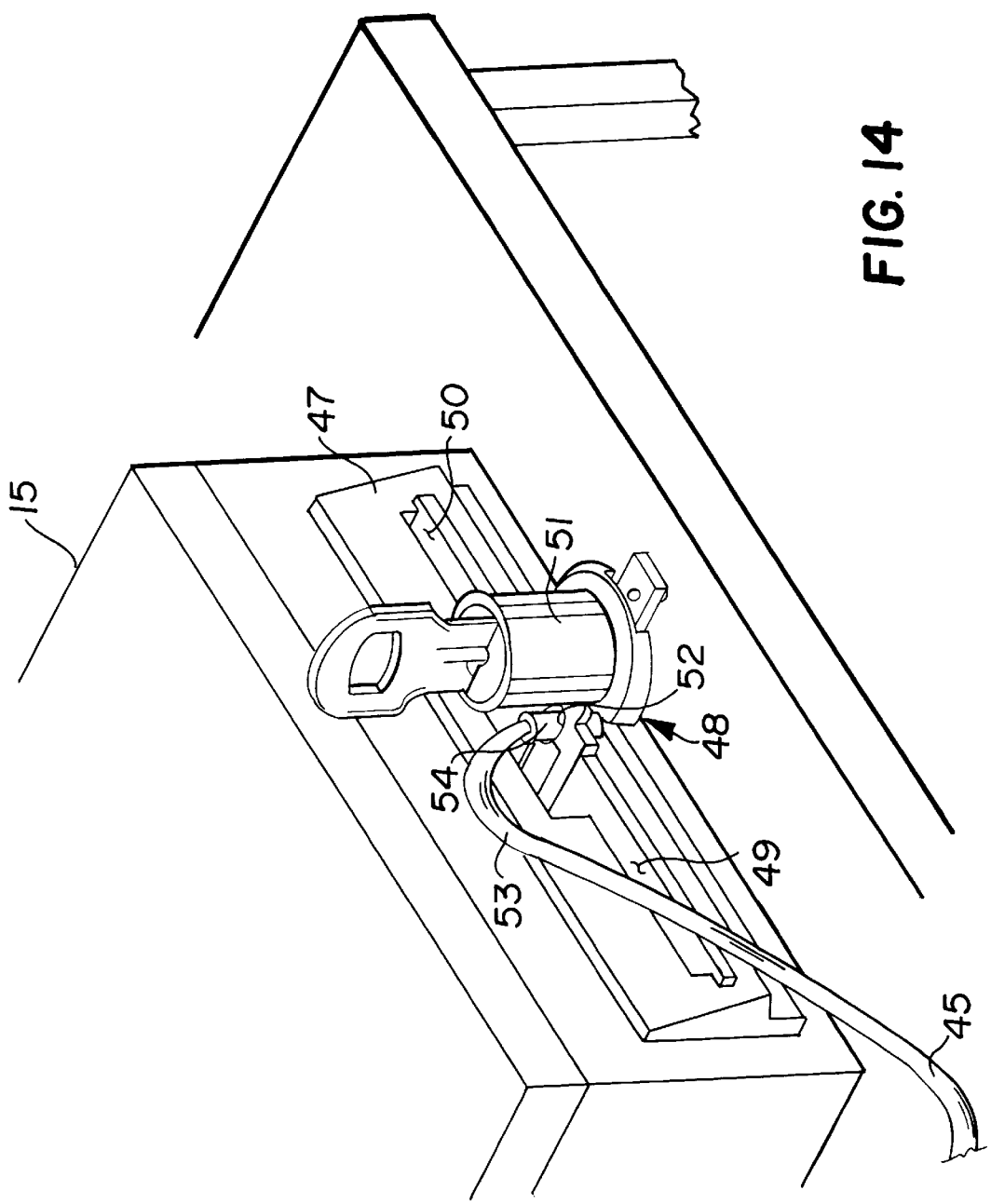
FIG. 14 shows how the end of the cable is secured to the disk drive lock.

As best shown in FIGS. 2 and 13–15, the PC 10 has a disk drive 47. In order to protect the disk drive 47 from unauthorized access thereto, a locking device 48 is inserted thereinto. Although many modifications of the locking device 48 are possible, in the preferred embodiment the locking device 48 includes a pair of pivoted plates 49, 50 retained within the disk drive 47 in their expanded position by a key-operated lock 51 carried by the plates 49 and 50. Each of the plates carries a mechanism (not shown) which prevents removal of the locking device 48 out of the disk drive 47, and stops any unauthorized movement of the locking device 48 in the direction out of the disk drive 47 until the key-operated lock 51 is unlocked by the authorized user 13. Only then the locking device can be removed, and the disk drive 47 can be accessed by the authorized user 13. One of the ends of the cable 45 can be secured to the locking device 48. For this reason, as best shown in FIG. 14, an externally-accessible portion of each plate 45 and 50 has a groove (preferably semi-circular) which form a circular opening 52 when the plates 49 and 50 are in their expanded position and held in this position by the key-operated lock 51. For being secured to the locking device 48, the respective end 53 of the cable 45 terminates in a metal cylinder 54 having a narrower part 55 which is trapped in the circular opening 52 of the locking device 48.

As best shown in FIGS. 6–8 and 10, in order to be secured within one of the retainers 35, another end 56 of the cable 45 is provided with a metal cylinder 57 having a flange 58, such that when the cable 45 is protruded through the retainer 35, the flange 58 restricts any further motion of the cable 45 and fastens the end 56 thereof in the retainer 35.

It will be appreciated by those skilled in the art, that the body 39 of the retainers 35 and 46 can be of circular or oval shape, instead of cubical, shown herein as one of examples.

Figure 15:
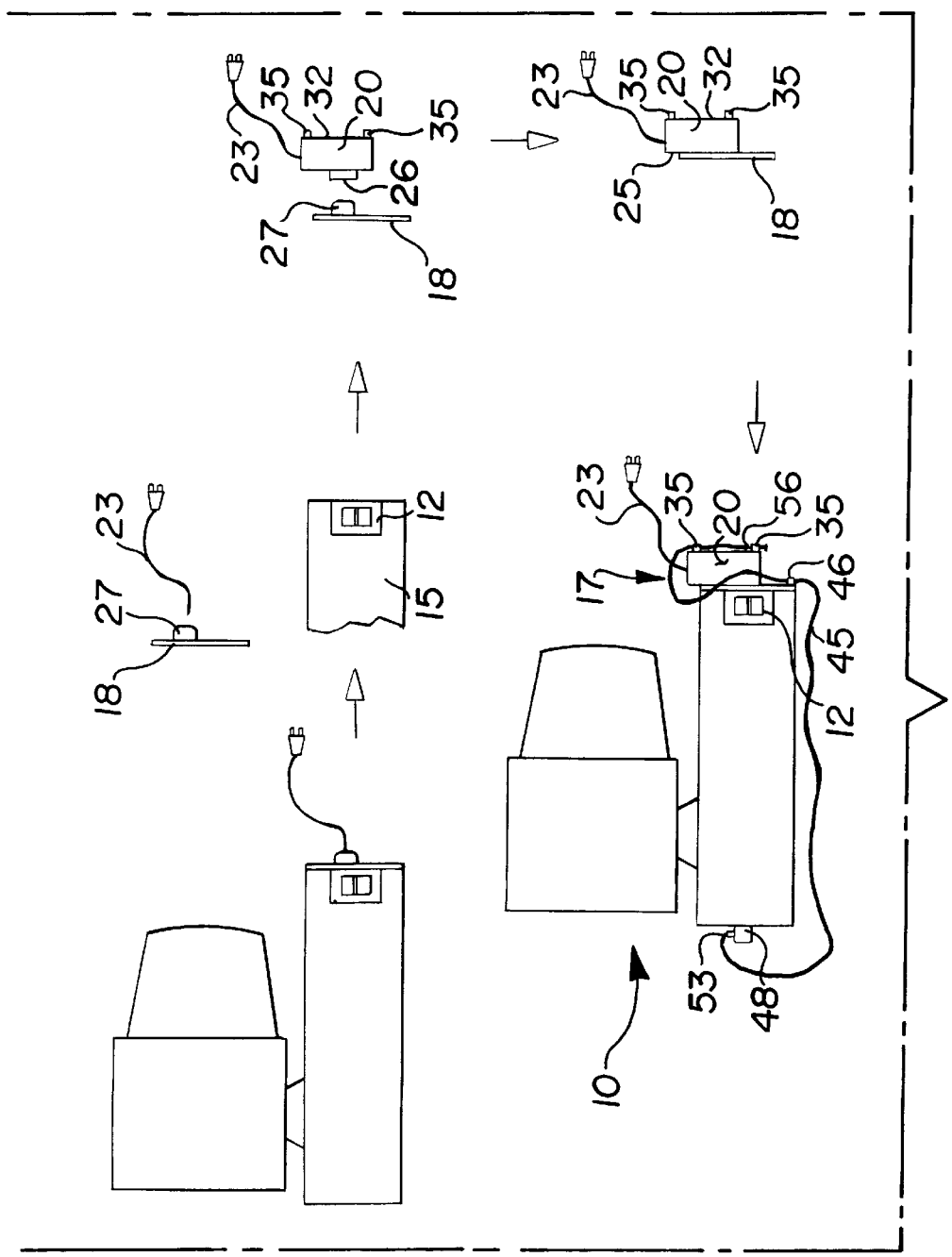
FIG. 15 shows the sequence of operations in installing the access control module on the PC.

FIG. 15 shows a sequence of steps for retrofitting the PC 10. If the authorized user for some reason wants to return to original PC, he (or she) can remove the housing 20 from the rear wall 18 and plug the standard power cord 23 into the intended plug on the PC 10.

All components of the access control module are readily available "off-the-shelf" items, such that a final product will be cost-effective and affordable for each owner of the PC 10.

Figure 9:
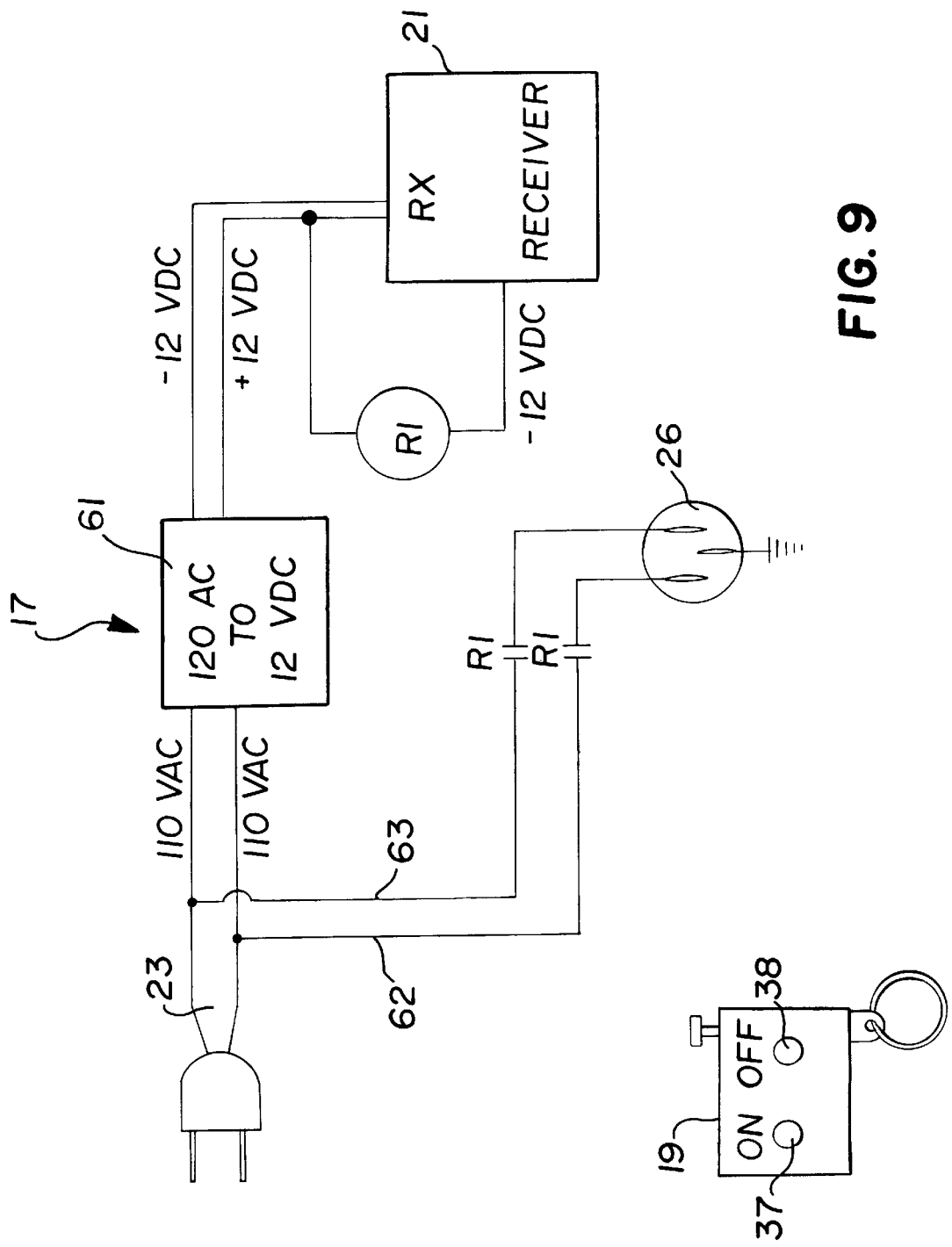
FIG. 9 shows, somewhat schematically, an electrical diagram of the access control module of the present invention.
Figure 13:
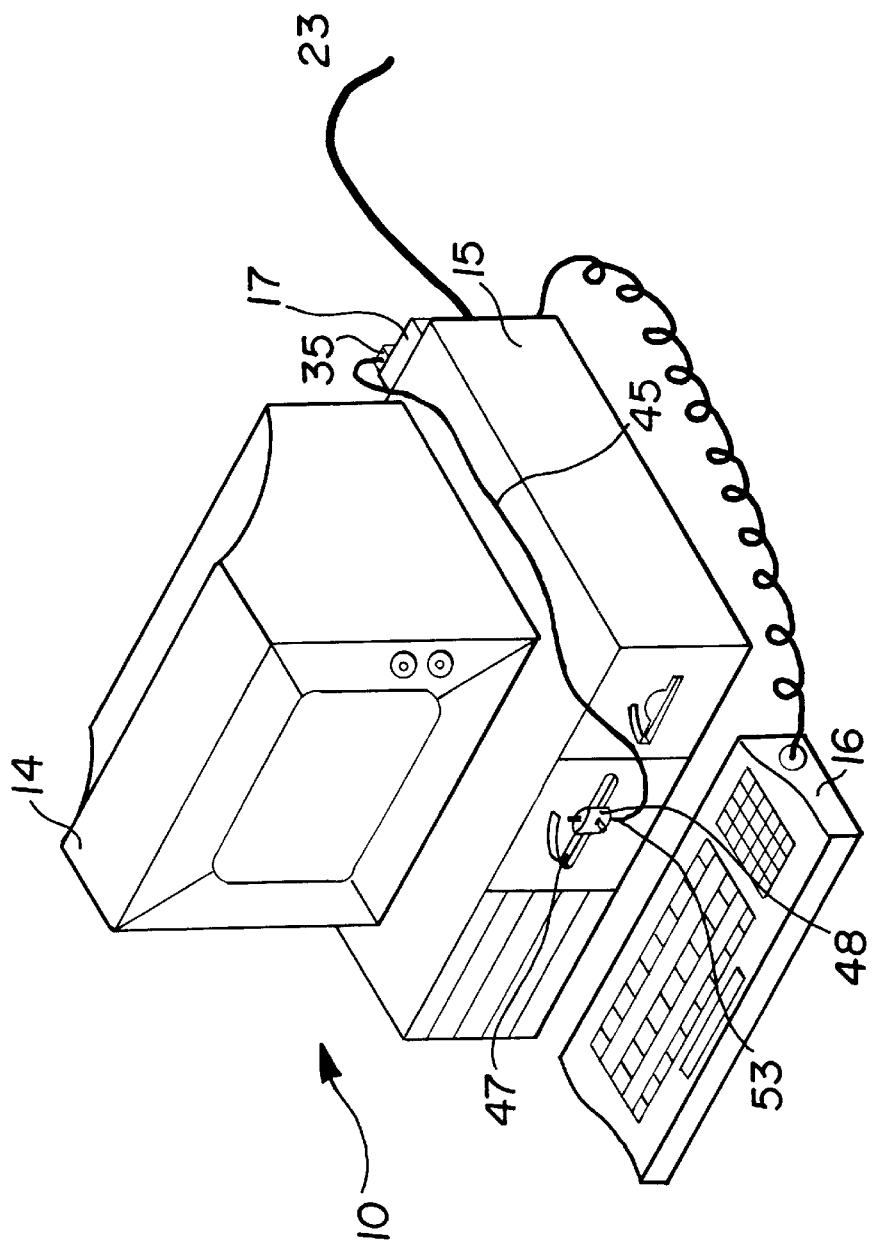
FIG. 13 shows the PC with a disk drive lock and the access control module of the present invention connected by the cable.
Figure 16:
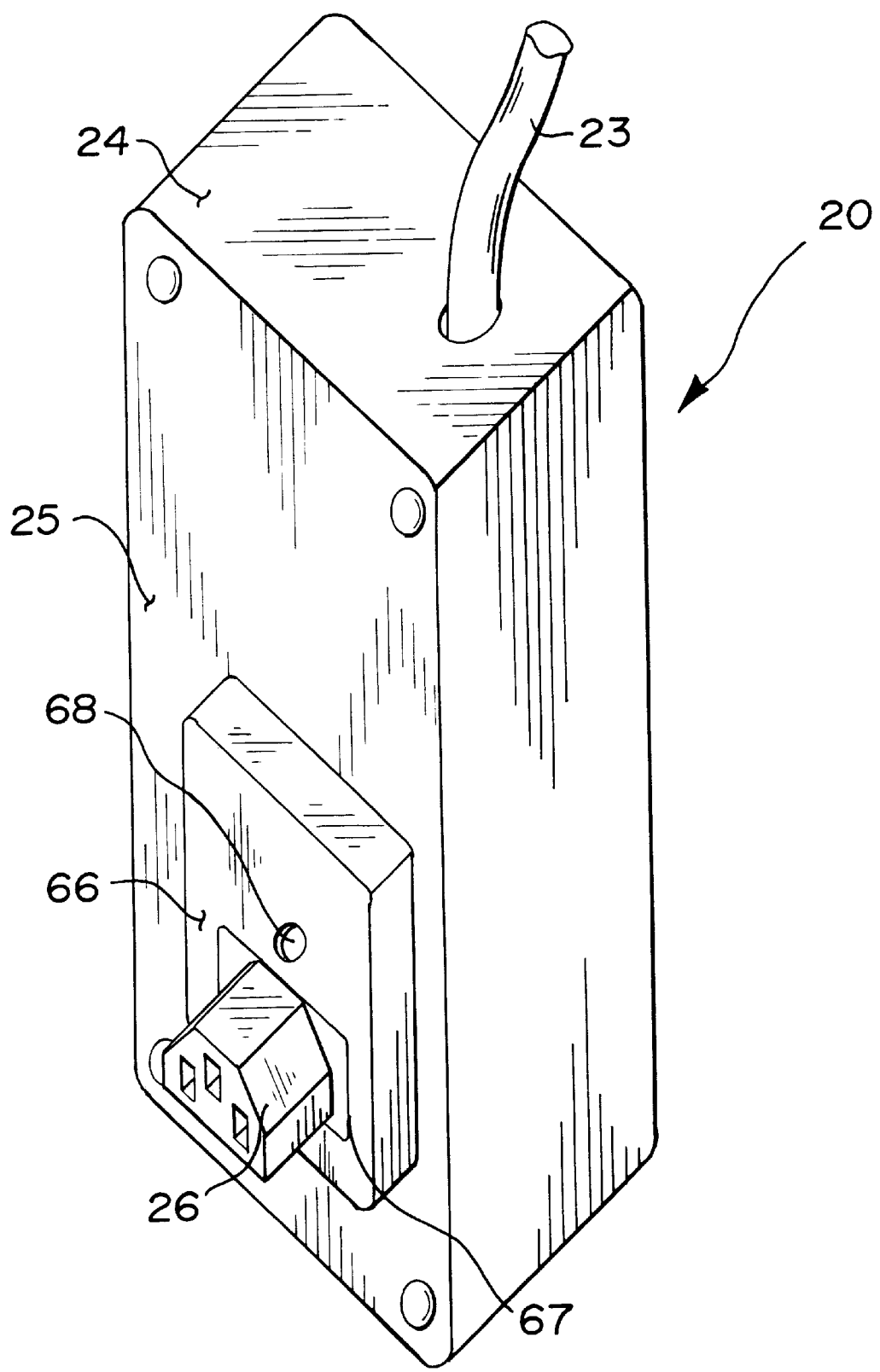
FIG. 16 is a perspective view of the housing of the access control of the present invention.
Figure 17:
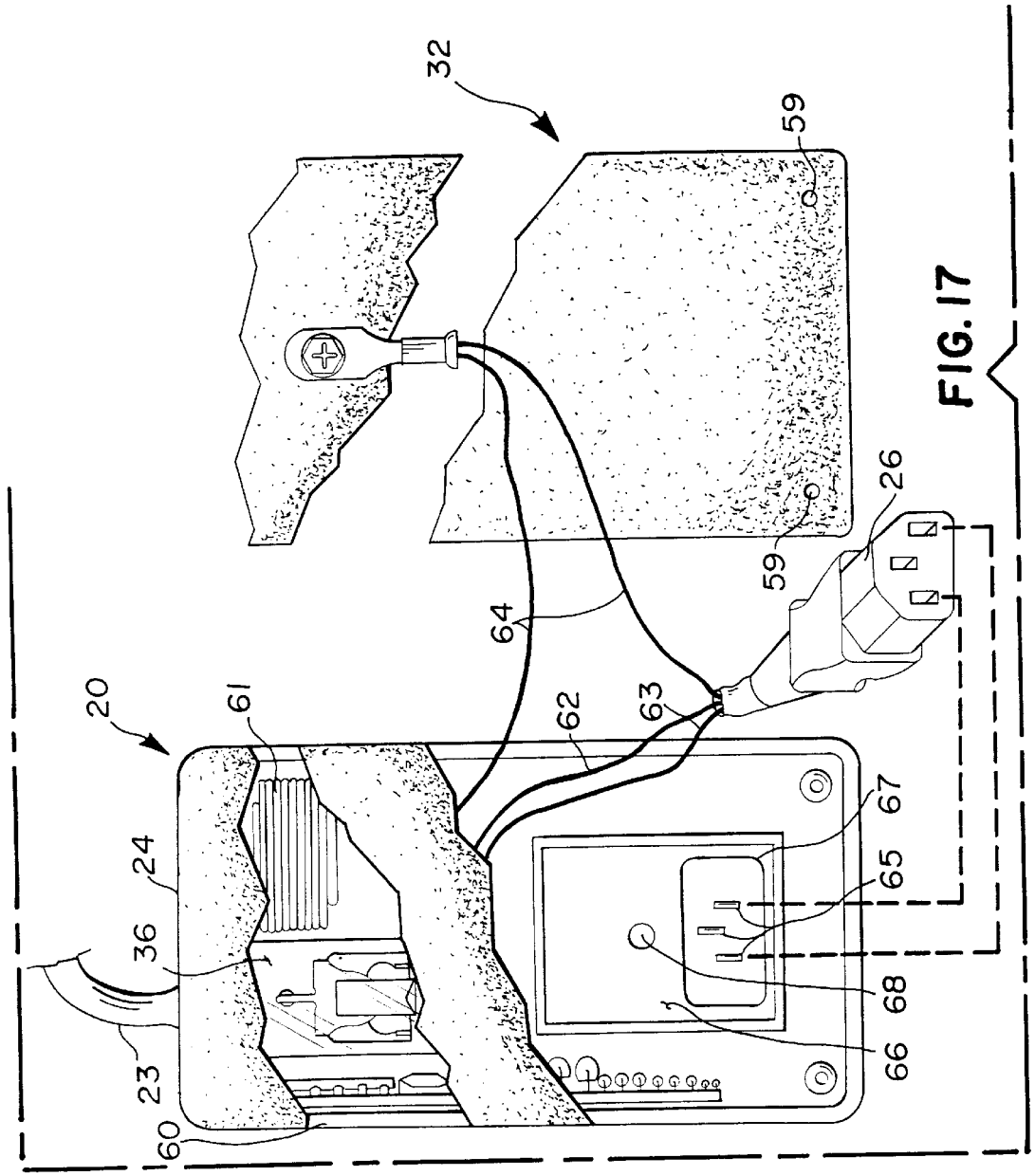
FIG. 17 shows a preferred positioning of the components of the access control module in the housing.

As best shown in FIGS. 16 and 17, the housing 20 accommodates the receiver 21 carried by the printed circuit board 60 (Vistec, Model RF 300R ), the second switch 36 (Radio Shack switch, Model 3610) and a transformer 61 (Signal Transformer, Model 14A-56-20) for converting AC to DC (as best shown in FIG. 9). the wires 62, 63 and 64 of the power cord 23 terminate in the female connector 26 (Beldon, Model CHU) for connection with prongs 65 of the male socket 27 (Sola, Model 212M) on the rear wall 18 of the PC 10. A relative disposition of the prongs 65 on the male socket 27 and the housing 20 is best shown in FIG. 17. The wire 64 is electrically and mechanically connected to the cover 32 for grounding purposes. Although not shown in FIG. 17, it will be understandable by those skilled in the art, that electrical connection shown in FIG. 9 exists between the components of the access control module 17. The housing 20 (which is a standard box for Archer, Model 27627) is modified by a rectangular raised boss 66 secured to the side 25 of the housing 20 by means known to those skilled in the art, for instance, by glueing the rectangular raised boss 66 to the side 25. The rectangular raised boss 66 has a opening 67 for passing the female connector 26 through and the opening 68 for the fastening screw 28 (discussed above and best shown in FIG. 8).

The access control set for the PC 10 will include, besides the access control module 17 and the transmitter 19, the disk drive locking device 48 of a unique design, a cable 45 and a manual (or video) explaining the sequence of installation and use of the access control system.

obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. In combination with a personal computer ("PC") having a main on/off switch and further having a rear wall provided with a receptacle for a standard power cord, the power cord being intended to be connected to a power supply, a self-contained access control module mounted directly on the rear wall of the PC, flush thereto, and having a plug received within the receptacle on the rear wall of the PC, wherein the self-contained access control module is prevented from being removed from the rear wall of the PC, such that the self-contained access control module cannot be physically accessed externally of the PC, the self-contained access control module further having a receptacle thereon, such that the standard power cord may be plugged into the receptacle on the self-contained access control module, and such that the self-contained access control module may be quickly connected between the PC and the power supply with a minimum of effort and without technical training, a secondary switch in the self-contained access control module and connected in series with the main on/off switch of the PC, a receiver within the self-contained access control module and controlling the secondary switch, and a remote transmitter for energizing the receiver in the self-contained access control module, thereby providing a retrofit system for preventing unauthorized use of the PC.

2. The combination of claim 1, further including at least one first fastening means for the self-contained access control module and at least one second fastening means for the rear wall of the PC, a bushing secured by each of the first and second fastening means to the self-contained access control module and to the rear wall of the PC, respectively, each of the bushings having a pair of aligned openings formed transversely therein above the respective fastening means, and a cable fitted through the aligned openings in each of the bushings and prevented from being removed therefrom, thereby preventing removal of the rear wall of the PC, and thereby preventing or discouraging unauthorized access to the interior of the PC.

3. The combination of claim 2, wherein the cable is wound about a stationary member, and wherein a locking means is provided for the cable, thereby preventing or discouraging theft of the PC.

4. The combination of claim 3, wherein the PC is further provided with a disk drive, and wherein the cable is connected to the disk drive, thereby preventing or discouraging unauthorized access to the disk drive.

5. The combination of claim 1, wherein the transmitter transmits coded signals.

6. In combination with a personal computer ("PC") having a main on/off switch and further having a rear wall provided with a receptacle for a standard power cord, the power cord being intended to be connected to a power supply, a self-contained access control module mounted directly on the rear wall of the PC, flush thereto, and having a plug received within the receptacle on the rear wall of the PC, wherein the self-contained access control module is prevented from being removed from the rear wall of the PC, such that the self-contained access control module cannot be physically accessed externally of the PC, the self-contained access control module further having a receptacle thereon, such that the standard power cord may be plugged into the receptacle on the self-contained access control module, and such that the self-contained access control module may be quickly connected between the PC and the power supply with a minimum of effort and without technical training, a secondary switch in the self-contained access control module and connected in series with the main on/off switch of the PC, and a portable hand-held means externally of the PC for controlling the secondary switch, thereby providing a retrofit system for preventing unauthorized use of the PC.

* * * * *